//106. COMPOSITIONS, COATING OR PLASTIC.
Patented Jan. 30, 1934

1,945,149

UNITED STATES PATENT OFFICE 1,945,149

CEMENT COMPOSITION

Loven Lasher, Denver, Colo.

No Drawing. Application March 28, 1931, Serial No. 526,133. Renewed August 7, 1933

1 Claim. (Cl. 87—17)

My invention relates to a liquid cement composition and the objects of my invention are:

First, to provide a new and novel liquid cement composition.

Second, to provide a very efficient cement composition.

Third, to provide a cement composition that will adhere to practically any surface, although the surface may be hard and smooth such as glass.

Fourth, to provide a composition of this class which may be utilized for any purpose that glues, adhesives or cements are now used with greater adhesive qualities.

Fifth, to provide a composition of this class which is very easily compounded, and Sixth, to provide a composition of this class which is very simple and efficient.

With these and other objects in view as will appear hereinafter, my invention consists of certain novel ingredients compounded in a certain novel way by a certain novel process as will be hereinafter described in detail and particularly set forth in the appended claim.

My composition consists of the following ingredients, compounded by the following method in the following proportions:

The ingredients used are silicate of soda, powdered rosin, gum arabic, litharge, glycerine and water.

These ingredients are combined in the following way in the following proportions:

First, a litharge solution is provided by taking three ounces of litharge and dissolving it with glycerine, then adding silicate of soda sufficient to make a thin paste, then placing three gallons of silicate of soda on a slow fire stirring it constantly from the bottom; just before it comes to the boiling point, add the paste consisting of litharge, glycerine and silicate of soda, and cooking for fifteen minutes, then straining the same and placing in a tight vessel.

A gum arabic solution is prepared by placing one pound of gum arabic in a tight vessel and filling with water and allowing it to stand until the gum arabic is dissolved in the water.

A rosin solution is prepared by taking two pounds of powdered rosin, pulverizing the same thoroughly, and adding sufficient water to make a thin paste. Place three gallons of silicate of soda in a vessel and let it cook slowly, stirring constantly from the bottom. Before it comes to a boiling point, add the rosin paste, stirring it in slowly, bring it to a boiling point and cook for thirty minutes stirring constantly, remove from the fire and strain while hot through a cheese cloth and strainer into a tight covered vessel.

After these solutions of litharge, gum arabic and rosin are prepared, take seventy-two ounces of the rosin solution and mix with ten gallons of silicate of soda and stir it thoroughly, then add eight ounces of the gum arabic solution and stir the mass, then add twenty-four ounces of the litharge solution pouring in slowly and stirring. After the mass is well mixed, it is poured and ready for use.

It has been found by experimentation that either the rosin or gum arabic may be omitted and the other ingredients used in the same proportions, or both the rosin and gum arabic may be omitted, producing a considerably less efficient composition for the purposes set forth although providing a valuable cement.

Although I have described a particular composition and process and certain modifications, I do not wish to be limited to this particular composition or modifications, or to th's particular process, but desire to include in the scope of my invention, the compositions and processes substantially as set forth in the appended claim.

Having thus described my invention, what I claim as new and desire to secure by Letters Patent is:

The herein described composition comprising silicate of soda, rosin, gum arabic, litharge, glycerine and water.

LOVEN LASHER.